March 27, 1945.  C. F. LEATHERS  2,372,211
WELDING APPARATUS
Filed May 11, 1942  4 Sheets-Sheet 1

March 27, 1945.  C. F. LEATHERS  2,372,211
WELDING APPARATUS
Filed May 11, 1942  4 Sheets-Sheet 3

FIG. 12.

INVENTOR
Chester F. Leathers.
BY
Harness, Dickey & Pierce
ATTORNEYS.

March 27, 1945.   C. F. LEATHERS   2,372,211
WELDING APPARATUS
Filed May 11, 1942   4 Sheets-Sheet 4

INVENTOR
Chester F. Leathers
BY
Harness, Dickey & Pierce
ATTORNEYS.

Patented Mar. 27, 1945

2,372,211

UNITED STATES PATENT OFFICE 2,372,211

WELDING APPARATUS

Chester F. Leathers, Detroit, Mich., assignor to Progressive Welder Company, Detroit, Mich., a corporation of Michigan Application May 11, 1942, Serial No. 442,463

24 Claims. (Cl. 219—4)

The present invention relates to apparatus for resistance welding and may be characterized in that the welding cycle is controlled in accordance with the temperature of the work in the region of the weld. The present application is a continuation in part of applicant's copending application Serial No. 415,015, filed October 15, 1941.

It will be appreciated from a complete understanding of the present invention that the improvements thereof are applicable to various different types of resistance welding, or related heating, operations. Spot welding operations now afford a preferred field of use of the present improvements, and by way of illustration but not of limitation, the invention is herein illustrated in connection with spot welding apparatus.

As will be appreciated, spot welding apparatus is now widely used in assembly and manufacturing operations involving a wide variety of metals and involving a wide range in thickness of the work. In welding heavier gauge metals of the order of one-fourth inch to one-half inch in thickness, for example, welding periods of one or more seconds are employed. In welding relatively light gauge metals generally, and in welding various metals, such as aluminum, alloys of aluminum, stainless steels, and the like, it has become the practice to effect the welds by passing a relatively high value of welding current through the work for an extremely short period of time. In this field, welding periods corresponding to a fraction of one half-cycle of a sixty cycle alternating current source are not infrequent, and various means have been proposed to accurately predetermine the length of each welding period with a view to obtaining uniform welds.

There are, however, a large number of variables which are encountered in resistance welding operations which, to the extent that they are present, prevent the obtaining of uniform welds. In certain classes of work these variables are not of sufficient importance to prevent successful use of existing welding systems. For other classes of work, these variables are so significant that they have, heretofore, prevented the successful use of resistance welding apparatus. Illustrative ones of these variables are:

1. Variations in the thickness or number of the workpieces which are to be welded together, which variations correspondingly alter the quantity of current which is required to effect a satisfactory weld.

2. Variations in the area of the work engaging faces of the electrode or electrodes, which variations result from the mushrooming of the tips and from tip-dressing operations.

3. Variations in the surface characteristics of the work, such, for example, as are caused by scale and the like.

4. Variations in the value of the current delivered to the weld in progress because of the presence of adjacent conducting paths, afforded by adjacent welds, or the like, and through which paths a portion of the welding current is shunted.

5. Variations in reactance, principally, the inductive reactance, of the welding circuit, such as are encountered in making a series of welds which are distributed over the surface of relatively wide workpieces.

6. Variations in the pressure applied between the work and the electrodes, which alters the contact resistance at the junctions between the workpieces and between the work and the electrodes.

7. Variations in the voltage of the source of welding current supply.

In accordance with the present invention, it is proposed to in large part, if not entirely, eliminate the effect of the above, as well as other variables, by controlling the welding operation in accordance with the temperature of the work in the region of the weld. Certain aspects of this method of control are disclosed and claimed in Jones Patent No. 2,104,749, granted January 1, 1938, and assigned, by mesne assignments, to the assignee hereof. The present invention constitutes improvements upon the teachings of the Jones patent in respect to the automatic correlation of certain of the steps of the welding operation and in respect to the manner in which the temperature measurements are effected, as well as in other respects, which appear hereinafter and in the appended claims.

With the above as well as other considerations in view, the principal objects of the present invention are to provide apparatus for resistance heating operations, such as welding, which may be readily and economically practiced and which enables the production of uniform heating actions, or, in welding, the production of uniform series of welds; to provide such a system which may be characterized in that a measure is obtained of a physical characteristic of the work, which varies during the flow of welding current, and which measure is utilized to control the flow of welding current, as well as to control other features of the welding cycle; to provide such a system wherein the just-mentioned physical characteristic is the temperature of the work in the region of the weld; to provide such a system wherein the temperature is taken at such points and under such conditions as to render the welding operation largely, if not entirely, free of variables which normally interfere with the making of uniform welds.

With the above as well as other, and in certain cases more detailed, objects in view, preferred but illustrative embodiments of the invention are shown in the accompanying drawings, throughout the several views of which corresponding reference characters are used to designate corresponding parts and in which.

Figures 1, 2, 3:
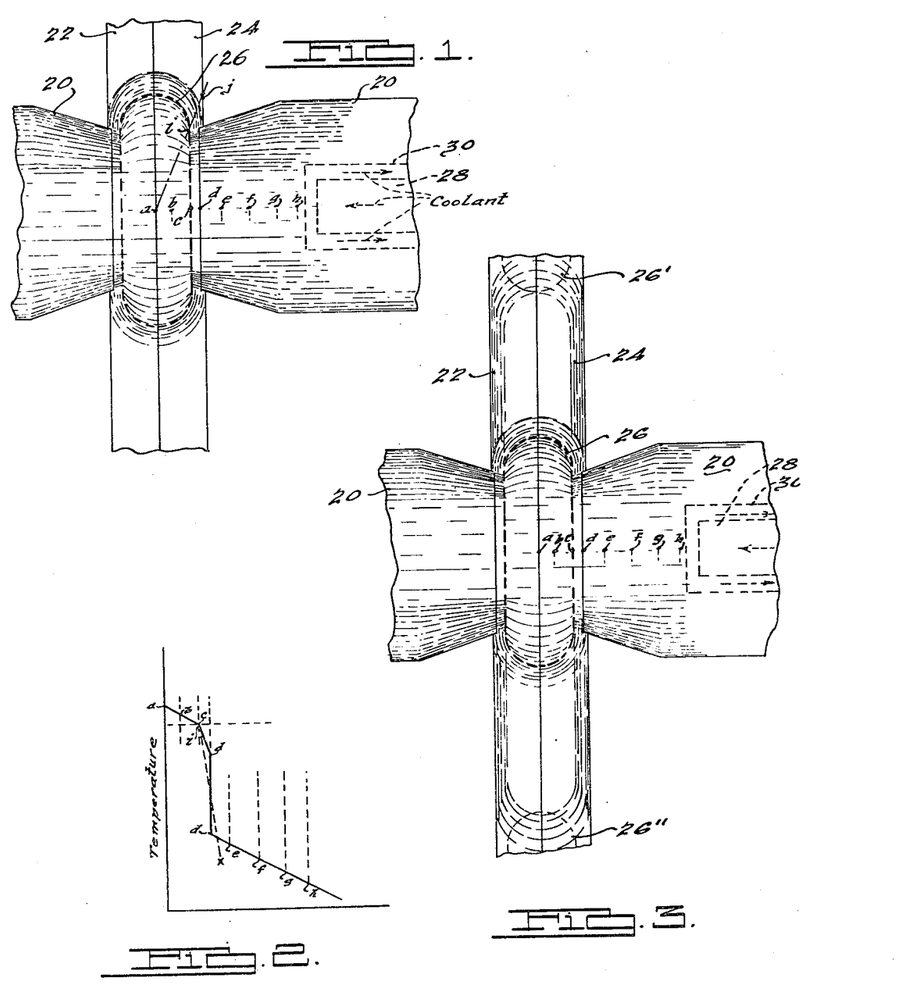
Figure 1 is a diagrammatic view illustrative of a typical spot welding operation.
Fig. 2 is a diagrammatic view, illustrating certain temperature gradients which are present in the arrangement of Fig. 1.
Fig. 3 is a diagrammatic view corresponding generally to Fig. 1.

Referring first to Fig. 1, illustrative spot welding electrodes 20 are shown as applied to the respectively opposite faces of a pair of workpieces 22 and 24, and the illustrative weld nugget which is produced by the flow of current through the electrodes 20 and the work is designated 26. The electrodes 20 may be and preferably are provided with artificial cooling means illustrated as comprising telescopically related inlet and discharge conduits 28 and 30, which are provided in the bodies of the electrodes, and through which a suitable coolant may be circulated during the welding operation.

As will be understood, heat is extracted from the electrodes 20 during the flow of welding current therethrough and for this, as well as other well known reasons, the only part of the welding circuit which rises to a welding temperature is the region adjacent the junction between the two workpieces 22 and 24, which region is constituted, in the completed weld, by the nugget 26. There is, therefore, a definite gradient between the temperature in the body of the nugget 26 and the temperatures of points external to the nugget, such for example, as points on the surface of the work, in the area adjacent the work, at the junction between the work and the electrode, and in the body or on the surface of the electrode. Certain of these temperature gradients are depicted in Fig. 2 in an illustrative sense, no attempt being made in this figure to utilize quantitative values. Considering the curve shown in full lines, for example, it will be noticed that the temperature falls gradually from the center of the nugget to the boundary of the nugget (point c) and falls more abruptly from the boundary of the nugget to the junction d between the work and the electrode. There is an abrupt temperature fall through this junction d, which is illustrated by the vertical portion d—d of the curve. Throughout the remaining portions of the curve, which include the points e, f, g and h, which lie within the body of the electrode, the temperature again gradually falls off to a minimum value determined by the cooling means. The temperature curve between the points a and i may be regarded as substantially the same as the portion a to c of the just-mentioned curve. Between the points i and j, however, the curve in question falls off relatively abruptly in the manner indicated by the dotted line in Fig. 2, and it may be expected that the temperature of the point j will, in comparison to the temperature of the point a, be not much in excess of that of the point h.

Under certain welding conditions, the temperature attained at points corresponding to the point j, as well as of other points in the region of the work and the electrodes, may be regarded as substantially uniform. Also, by the maintenance of proper cooling conditions, the maximum temperatures attained at the point h, for example, in Figs. 1 and 2, may be maintained substantially uniform. Various cooling arrangements may be used, in a generic sense, but it is preferred to use a cooling arrangement such as is described and claimed in the copending application of the present applicant and W. G. Moehlenpah, Serial No. 446,176, filed June 8, 1942, as a continuation-in-part of their copending but now abandoned application, Serial No. 415,184, filed October 16, 1941, in which a refrigerant is circulated through the passages 28 and 30, in such quantity and at such temperatures as to insure that the maximum temperatures attained by points in or on the electrode remain at relatively low and substantially uniform values during the course of successive welding operations. For example, brine at a temperature of 0° F. or below may advantageously be used, and may be circulated at a rate sufficient to maintain the electrode faces at such low temperatures during the making of welds, as to greatly minimize the normal mushrooming tendencies of such electrodes.

It will be appreciated from the foregoing that there are, near but external to the weld nugget, a number of points which, during the course of each welding operation, attain a temperature which bears a substantially fixed relation to the temperature of the weld nugget 26, and in the present description and claims, the phrase "in the region of the weld" is used to generically describe points in the weld nugget, as well as such external points. As aforesaid, it is proposed, in accordance with the present invention, to measure the temperature of one or more points in the region of the weld and to use this temperature to control the welding operation. It will be appreciated that in a generic sense various types of apparatus such, for example, as thermostatically controlled apparatus, apparatus responsive to radiant energy, and resistance thermometry apparatus can be utilized. Preferably, however, the control is effected by means of thermoelectric apparatus.

Figure 4:
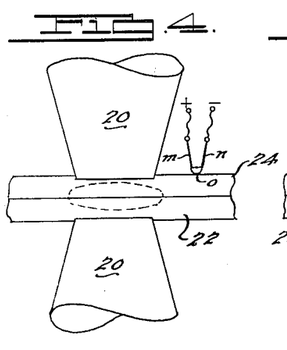
Figs. 4 through 9 are diagrammatic views illustrative of typical thermoelectric arrangements which may be used in the practice of the present invention.
Figure 5:
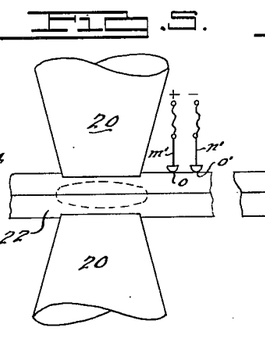
Figure 6:
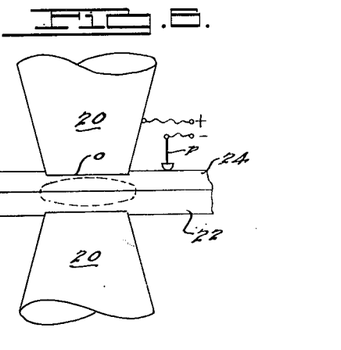

Illustrative thermocouple arrangements which may be used to obtain a temperature measurement at a point in the region of the weld, for example, the points d and j in Fig. 1, are shown in Figs. 4, 5 and 6. Referring particularly to Fig. 4, a pair of wires m and n, formed of dissimilar metals, are joined together at o, and the junction o is maintained in engagement with the surface of the workpiece 24. With such an arrangement it will be appreciated that a thermal E. M. F. is developed between the wires m and n, which is proportional to the difference between temperature of the surface of the work at the point where the junction o is applied thereto and the temperature of a second junction (not shown) between these wires. This second junction may be constituted by the measuring apparatus to which the wires m and n are connected. For the purposes of all arrangements disclosed in this specification, the temperature of the second junction may be regarded as constant. In the modified arrangement of Fig. 5, a pair of wires m' and n' are provided with terminals by which they may be pressed against the surface of the workpiece 24 adjacent the point at which the work is engaged by the electrode 20, and in this instance it is assumed that the wire m' and the workpiece 24 together constitute a thermocouple. During the course of the welding operation, consequently, a thermal E. M. F. is developed at the point o at which the wire m' engages the work. The wire n' is electrically connected to the work, and consequently the thermal E. M. F. developed between the wires m' and n' is proportional to the temperature at the point o. It will be understood that, if desired, the wire n' may be so selected that it forms a thermocouple with the work 24, in which event the thermal E. M. F. developed between the wires m' and n' is equal to the algebraic sum of the thermal E. M. F.'s developed at the points o and o'.

Referring now to Fig. 6, the electrode 20 and the work 24 are assumed to be of dissimilar materials, for example, respectively, copper or an alloy thereof and aluminum or an alloy thereof. These elements, consequently, form a thermocouple which measures a temperature at the junction o between them. In this instance, a co-operating wire p is applied to the work 24, and it will be understood, accordingly, that a thermal E. M. F. is developed between the electrode 20 and the wire p, which is proportional to such temperature.

In Figs. 4, 5 and 6, it is assumed that there are no conducting paths near the nugget 26 through which any substantial part of the current flowing through the electrodes 20 may be diverted away from the nugget 26. Consequently, in Figs. 4, 5 and 6, the temperature rises of points o and o' are proportional to and are determined by the nugget temperatures. In other welding operations, where the weld in progress is located near other conducting paths, such, for example, as are afforded by adjacent welds, the temperature measurement should be taken at a point, the temperature whereof is substantially unaffected by shunting currents which are diverted through these adjacent conducting paths. The effect of these shunting currents is illustrated in Fig. 3, and illustrative arrangements which are effective to eliminate the effects thereof are shown in diagrammatic form in Figs. 7 through 9.

Referring first to Fig. 3, the nugget 26, which is to be formed between the workpieces 22 and 24, is located between a series of adjacent welds, including the nuggets 26' and 26'', which latter nuggets form conducting paths, which, during the course of each welding operation, form shunt circuits, through which a portion of the current which passes through the electrodes 20 is diverted away from the zone in which the nugget 26 is to be formed. By virtue of this diversion, the total current flowing through the electrodes 20 cannot be taken as a measure of the current flowing through the zone in which the nugget 26 is to be formed, and it will be recognized that a considerably larger such total quantity of current is needed in forming the nugget 26 than would be the case if the shunting circuits were not present. Also, such shunting currents affect temperatures in the regions contemplated in Figs. 4 and 5.

It has been found, in accordance with the present invention, that the temperatures of those parts of the electrode 20 adjacent the axis thereof are affected by shunting conditions to a lesser extent than are the temperatures of parts of the electrode near or on the side walls thereof, or of parts external to the electrode. It has further been found, in accordance with the present invention, that the distance along the line $a$—$h$ (Fig. 3) from the point $a$, at which the measurement is taken, is an important factor in eliminating the effect of shunting currents. For example, temperature measurements taken adjacent the axis of the electrode, and in the region of the point $h$ in Fig. 3, are considerably more affected by shunting currents than are temperature measurements taken adjacent the axis of the electrode, in the regions of the points $d$ and $e$. It will be appreciated that various considerations determine the point or points along the line $a$—$h$ in Fig. 3, at which the effect of shunting currents becomes substantial enough to cause trouble. Certain of these considerations have to do with the character of the work, the number and spacing of the shunting paths relative to the path through the nugget in progress, the cross-sectional area and composition of the electrode, the current densities, the temperature and quantity of coolant that is used, and the spacing between the face of the electrode and the bottom of the coolant passage 28. Particularly good results are obtained when the temperature measurements are taken near the axis of the electrode, and at or in the immediate region of the junction between the electrode and the work. At this point or points the temperature appears to be determined almost entirely by the current which passes through the nugget. More particularly, the temperature rise at such a point appears to be almost entirely due to the heating effect ($I^2R$) of the nugget current plus the effect of heat conduction from the nugget through the point. In accordance with the preferred arrangement of the present invention, therefore, it is proposed to effect the temperature measurement at a point, relative to the body of the electrode, the temperature whereof is predominantly determined by currents which flow through the nugget, or stated in a different way, by the temperature of the nugget. Moreover, for additional reasons mentioned below, it is preferred to introduce the thermocouple elements into the body of the electrode in such relation that the temperature measurement is taken relatively near the axis of the electrode and in a transverse plane which is at or in the immediate region of the junction between the electrode and the work.

Figures 7, 8, 9, 10, 11:
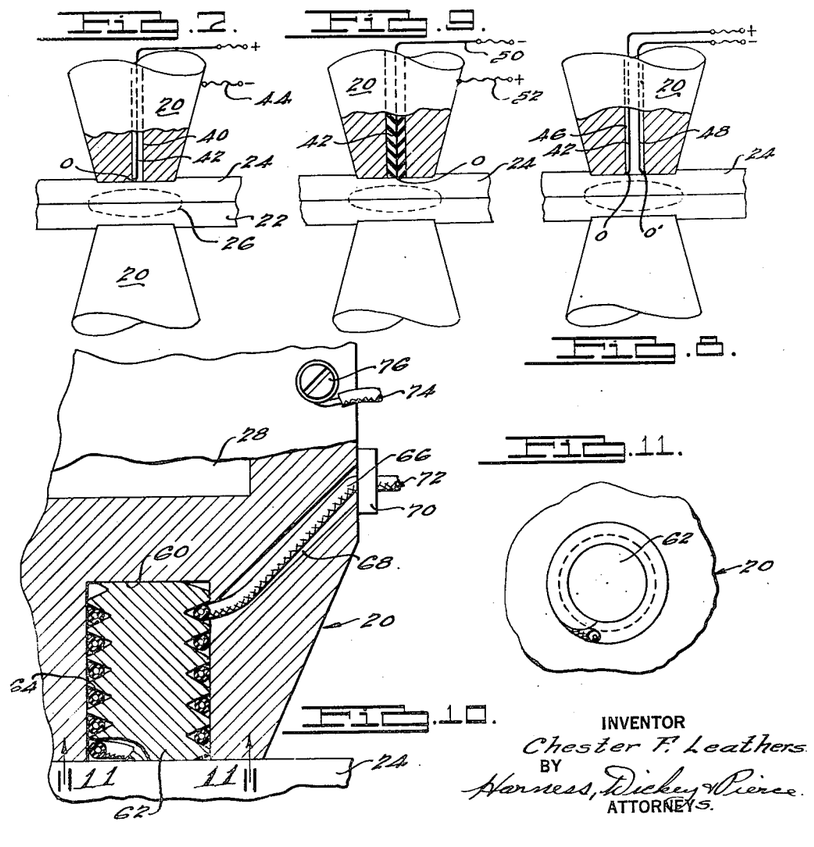
Fig. 10 is a view in longitudinal central section of an electrode structure embodying the invention.
Fig. 11 is a view in end elevation, taken along the line 11—11 of Fig. 10.

Illustrative thermocouple arrangements which may advantageously be used in eliminating the effect of shunting currents are diagrammatically shown in Figs. 7, 8 and 9. In Fig. 7, the electrode 20 is provided with a central bore 40, which opens through the face of the electrode, through which an insulated wire 42 is passed. The bared end of the wire 42 is electrically connected to the electrode 20 at the work engaging face of the electrode, which point is designated o. Assuming the electrode 20 is of usual copper or copper alloy composition, the wire 42 may advantageously be formed of one of the alloys known as "constantan," in which event, during the flow of current through the electrode 20 and workpieces 22 and 24, a thermal E. M. F. is developed at the point o, which, as aforesaid, is determined primarily by currents flowing through the nugget 26, or by the temperature of such nugget. This thermal E. M. F. may be measured between the wire 42 and a cooperating lead 44, which is connected directly to the electrode 20. In certain instances, it is preferred to pass both of the thermocouple leads through the body of the electrode in the relation shown in Fig. 8, in which figure the electrode 20 is provided with a central bore 46, which opens through the work engaging face of the electrode and through which a pair of thermocouple wires 42 and 48 are passed. As before, the wire 42 may be formed of constantan and the wire 48 may be formed of copper or other material. In this instance, the wires 42 and 48 are electrically coupled to the electrode at the points o and o', and for the reasons mentioned in connection with Fig. 7, the thermal E. M. F. is developed at the point o. By virtue of the connection between the electrode and the wire 48 at the point o', this thermal E. M. F. may be measured between the wires 42 and 48. It will be understood that if the wire 48 is dissimilar to the electrode 20, an additional thermal E. M. F. is developed at the point o', in which event the E. M. F. between the wires 42 and 48 is the algebraic sum of the E. M. F.'s developed at the points o and o'.

In the remaining embodiment shown in Fig. 9, the electrode 20 is provided with a central bore 42, through which a wire 50 is passed. The bared end of the wire 50 is maintained in insulated relation to the electrode 20, but is disposed to directly engage the face of the workpiece 24. Assuming, for example, that the wire 50 is formed of constantan and the work 24 is ferrous, a thermal E. M. F. is developed at the point o, which is proportional to the temperature of the surface of the work. As shown, this thermal E. M. F. is measured between the wire 50 and a lead 52, which is directly connected to the electrode 20, which electrode 20, of course, is in electrical connection with the work 24.

Reverting to the structure of Fig. 6, it will be noticed that the thermoelectric junction is the junction between the work and the electrode and, consequently, the temperature which is measured is a temperature at this junction. As aforesaid, however, it is to be recognized that the actual temperature of the face of the work is considerably higher than the actual temperature at the work engaging face of the electrode. There is, therefore, a temperature gradient through the just-mentioned junction. Experimental evidence indicates that the thermal E. M. F. which is produced is determined by the higher of the two temperatures, namely, the temperature of the surface of the work, but for the purposes of the present specification, the term "temperature at the junction" is used to refer to that temperature along the just-mentioned gradient, which in actual fact determines the thermal E. M. F. in question. Similarly, with the arrangement of Fig. 7, since the wire 42 engages the electrode at the work engaging face of the latter, it may be expected that the end of the wire also engages the work, which latter point of engagement may constitute a thermal junction, at which an E. M. F. is developed. In practice it appears that the arrangement of Fig. 7 affords a more perfect thermal junction between the wire 42 and the electrode 20 than is afforded between the wire 42 and the work, and it is, therefore, considered that the temperature measured by the arrangement of Fig. 7 is the temperature of the work engaging face of the electrode. The arrangement of Fig. 7 may, therefore, be generically described as one which measures the temperature at the junction between the work and the electrode, and, in a more specific sense, may be described as one which measures the temperature at the work engaging face of the electrode. Similar comments apply to the arrangement of Fig. 8. On the other hand, with the arrangement of Fig. 9, in which the bared end of the thermocouple wire 50 is insulated from the electrode, but directly engages the work, the temperature which is actually measured appears to be the temperature at the surface of the work. This latter arrangement may, however, be generically described as measuring a temperature at the junction between the work and the electrode.

A satisfactory embodiment of the thermocouple arrangement of Fig. 7 is shown in Figs. 10 and 11, in which figure the electrode 20 is provided with a centrally disposed counterbore 60, which receives, with a press fit, a plug 62. The plug 62, which is preferably formed of the same material as the electrode 20, is provided with a relatively deeply cut thread 64, into the roots whereof an insulated thermocouple wire 66 is wound. It will be understood that the diameter of the wire 66, including its insulating sheath, relative to the depth of the thread 64, is such that the wire is tightly wedged in place in the thread roots when the plug 62 is driven into the counterbore 60. The inner end of the wire 66 passes through a transverse passage 68, which communicates with the counterbore 60, and may be provided with a suitable connector 70, by which it may be connected to a lead wire 72 which may extend to the apparatus which responds to the thermocouple. The other lead wire 74 may be directly connected to the electrode 20 by means of a screw 76.

In the completely assembled form, the outer end of the plug 62 is flush with and forms a portion of the work engaging surface of the electrode, which relation may, of course, be obtained by initially forming the plug 62 so that a portion thereof projects beyond the face of the electrode after the plug is driven into place. Such projecting portion may thereafter be machined away or otherwise removed. It will be understood that when the end of the plug is machined into flush relation with the face of the electrode, the extreme and bared end of the wire 66 is exposed at the work engaging face of the electrode.

The machining or other dressing operations also serve to scour away the insulation from the wire 66 for a short distance back from the end thereof, of the order, for example, of several thousandths of an inch, leaving a corresponding length of bared wire 66. The pressure between the electrode and the work, when the electrode 20 is placed in service, forces this bared wire end into intimate contact with the surface of the plug 62 or the surface of the adjoining parts of the electrode 20, or both, thus affording an efficient thermal junction between the end of the wire and the electrode 20. As is mentioned in connection with Fig. 7, this same pressure also effects a junction between the work and the wire 66, but in view of the fact that the surface of the work may be expected to carry certain impurities, it appears in practice that the thermal junction between the wire and the electrode is the more efficient of the two, and that the consequent thermal E. M. F. is determined by the temperature of the face of the electrode.

It is believed to be evident that the arrangement of Figs. 10 and 11 may also be arranged to incorporate two wires, so as to produce an arrangement of the type described in connection with Fig. 8, by, for example, winding two such insulated wires into the thread of the plug. In this instance, the bared ends of both wires are exposed at the electrode face and are thermally joined by the aforementioned electrode pressure, either directly together, or through the face portions of the electrode. A satisfactory arrangement embodying the features of Fig. 9 is illustrated in the copending application of Louis M. Benkert, Serial No. 435,655, filed March 21, 1942, and assigned to the assignee hereof, now Patent No. 2,354,190, granted July 25, 1944.

The heat developed at the junction between the work and the electrode also tends to burn away the insulation from the extreme end portions of the wire 66. Proper selection of the insulating material, however, enables this burning away to be retarded. Moreover, proper control of the electrode cooling arrangement makes it possible to maintain the temperature in the body of the electrode at such a low value that this burning away does not extend a significant distance from the face of the electrode into the body thereof. For example, in using the aforesaid refrigerated method of cooling, this burning away can be limited in practice to a distance of the order of two or three thousandths of an inch. Moreover, even though such burning away takes place, the electrode pressure which forces the wire 66 into engagement with the face of the electrode, so as to form the thermal junction, is applied between the wire 66 and the exposed face of the electrode, so that the resulting thermal junction is located at such exposed face.

A very important advantage, which is realized with the construction of Figs. 10 and 11, and consequently with the constructions of Figs. 7, 8 and 9, is that repeated tip-dressing operations, which renew the face of the electrode, can be made without readjustment of the embedded thermocouple elements. Thus, as the face of the electrode is ground away, the face of the plug 62 and the end of the wire 66 are similarly ground away. At each new facial plane of the electrode, consequently, a bared end of the thermocouple wire 66 is exposed on and flush with the work engaging surface of the electrode. Throughout the life of the tip, therefore, the thermocouple elements remain effective to measure temperature conditions at the junction between the work and the electrode.

In the generic aspects of the invention, a wide variety of control systems may be associated with the temperature responsive elements in such a way as to suitably control the flow of current, as well as related steps of a complete welding cycle, in accordance with the temperature in the region of the weld. The control systems specifically shown in the present application are ones wherein thermocouple elements are utilized to terminate the flow of current, initiate a hold-time or setting period, and ultimately release the electrodes from the work. In the arrangement of the aforesaid Jones patent, on the other hand, the thermocouple elements are utilized to start a definite timing period at the expiration of which the flow of current is interrupted. Further, in the copending application of the present applicant and Louis M. Benkert, Serial No. 447,006, filed June 15, 1942, as a continuation-in-part of their copending application, Serial No. 422,036, filed December 8, 1941, and assigned to the assignee hereof, thermocouple elements are utilized to control the delivery to the work of a succession of heats, including a welding heat and subsequent heats in which the temperature of the nugget is raised to points below the melting temperature thereof. Various other arrangements are regarded as falling within the scope of the invention, and the just-mentioned systems, as well as the herein disclosed systems, are to be considered in an illustrative and not in a limiting sense.

Figure 12:
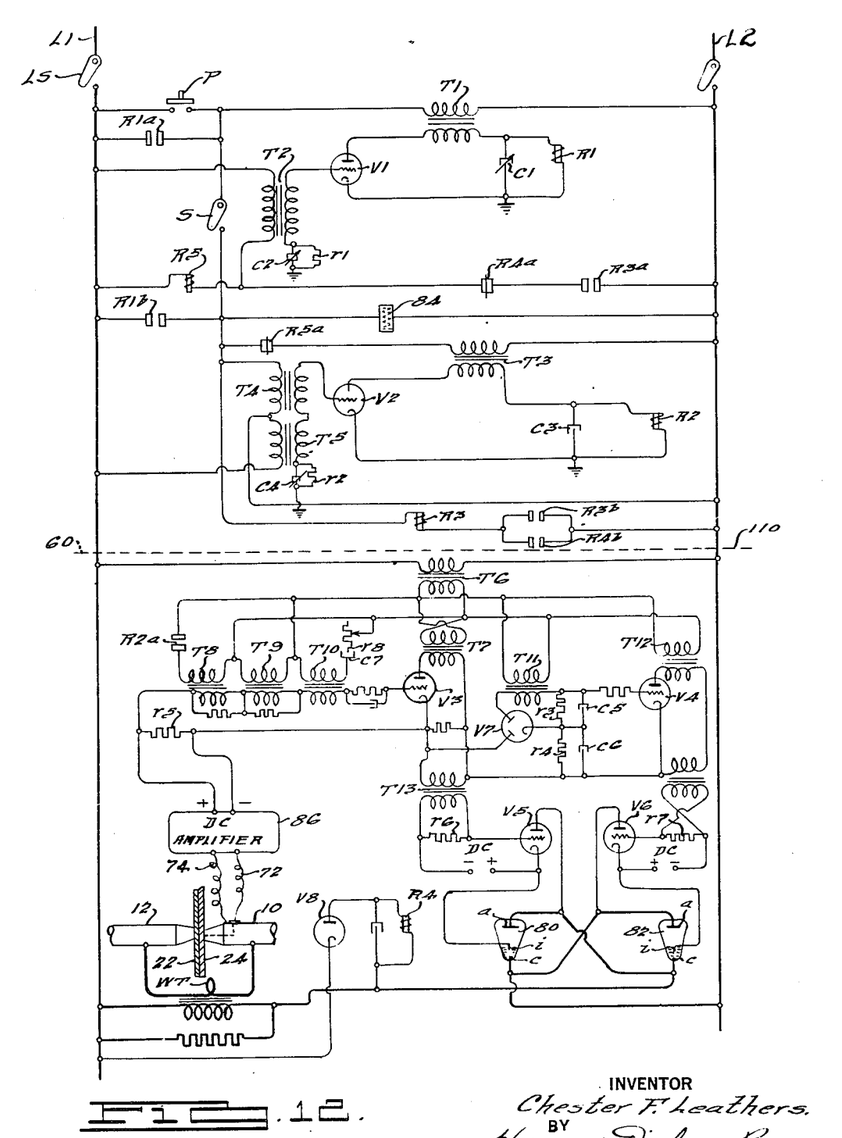
Fig. 12 is a diagrammatic view of a control system which may be used in the practice of the invention.

Referring first to Fig. 12, a system is illustrated which is primarily suited to welding operations wherein the welding current is required to flow, either continuously, or as a succession of impulses, for a period comprising a plurality of cycles of the supply source. Briefly stated, the system comprises a plurality of electronic valves V1 and V2, which may be and preferably are of the evacuated type, and a plurality of valves V3, V4, V5 and V6, which may be and preferably are of the gas-filled type. Each of the valves in question is provided with principal electrodes and with a control electrode, and these valves, in cooperation with related control relays R1, R2, R3, R4 and R5 and the thermocouple elements 66 and 72, serve to control the length of the period throughout which the welding transformer WT is supplied with current from the alternating current line conductors L1 and L2, through a pair of main rectifiers 80 and 82. The rectifiers 80 and 82 may be of any suitable type, but are preferably of the gas-filled type known commercially under the trade name "Ignitrons." The thermocouple elements are illustrated as being arranged as described with reference to Figs. 7, 10 and 11. It is believed that the remaining details of the system may best be understood from a description of the operation. The system of Fig. 12 may be conditioned for operation by closing the illustrative line switches LS, which action may be arranged, as will be understood, to apply heating current to the filaments of the several valves V1 through V8, the circuits for which are conventional and have been omitted from the drawings to simplify them. The closure of line switches LS also completes energizing circuits for the primary windings of transformers T5 and T6. The energization of transformer T5 supplies charging current to the control condenser C4, associated with the grid circuit of valve V2, and applies a blocking bias to this valve, which renders it non-conductive. The energization of transformer T6 enables it to energize transformers T7, T9, T10, T11 and T12. The secondary windings of transformers T9 and T10 are connected to the grid of the valve V3, and transformer T9 is so connected as to apply a blocking bias potential to such grid, thereby rendering valve V3 non-conductive. Transformer T10, which is preferably of the peaking type, acts in opposition to transformer T9, but the peaked potential developed by transformer T10 is not sufficient to overcome the bias of transformer T9. The energization, consequently, of transformer T7, which is coupled to the principal electrodes of valve V3, is without immediate effect. Transformer T11, upon being energized, builds up a charge on condenser C5, through the usual rectifier V7, and applies a blocking potential to the grid of valve V4, thereby rendering this valve non-conductive. Accordingly, the energization of transformer T12, which is coupled to the principal electrodes of valve V4, is without immediate effect. It will be noticed that the connections for transformers T7 and T12 are the reverse of each other, so that transformer T7 is effective to apply positive potentials to the anode of valve V3 during half-cycles of one polarity, while transformer T12 applies positive potentials to the anode of valve V4 during half-cycles of opposite polarity. Both valves V3 and V4, however, remain non-conductive, under the conditions stated, by reason of the blocking potentials applied to the grids thereof.

Assuming it is desired to perform a welding operation, the illustrative pilot switch P may be closed, which action completes an obvious energizing circuit for the primary winding of transformer T1. Under the conditions stated, transformer T2, associated with the grid of valve V1, is de-energized and valve V1 is in a conductive condition. Consequently, the energization of transformer T1 causes current to flow through valve V1 and energizes control relay R1, which thereupon closes its normally open contact members R1a and R1b. The closure of contact R1a completes a holding circuit in parallel with the pilot switch P, which may thereupon be released to the open position without effect.

Closure of contact R1b completes obvious energizing circuits, in parallel with each other, for the solenoid operated valve 84, the plate transformer T3, associated with valve V2, and the grid transformer T5, associated with valve V2. Upon being energized, the solenoid operated valve 84 completes usual fluid circuits (not shown) which cause the illustrative electrodes 22—24 to move relative to each other and clamp the work between them. The energization of transformer T3 applies potential to the valve V2, which action is, however, without effect since this valve is blocked, as previously mentioned.

The energization of transformer T5 introduces a voltage into the grid circuit of valve V2, which opposes and in part at least overcomes the voltage of the previously mentioned transformer T4. Upon the energization of transformer T5, therefore, all or a part of the energy stored in condenser C4 is enabled to discharge through the discharge circuit afforded by the resistor r2, and at the expiration of a period determined by the characteristics of this discharge circuit, the grid of valve V2 reaches a potential at which this valve is conductive. At this time, valve V2 passes current and enables transformer T3 to energize control relay R2.

Upon being energized, relay R2 closes its contact members R2a, which contact members are disposed in the circuit of the primary winding of transformer T8, associated with the grid of valve V3, and this action initiates the firing of the main rectifiers 80 and 82 and, consequently, initiates the flow of welding current. It will be noticed that the energization of relay R2 is delayed, after the energization of the valve solenoid 34, for an interval of time sufficient to insure that the electrodes are in engagement with the work before the flow of welding current is initiated.

More particularly, closure of contacts R2a energizes transformer T8, the connections for which are the reverse of those for transformer T9, thereby enabling transformer T8 to at least partially neutralize transformer T9. Under these conditions, the peak voltage developed by transformer T10 is enabled to bring the grid of valve V3 to a value at which this valve becomes conducting. The point in the successive half-cycles, at which the peak voltage of transformer T10 is developed, is determined, of course, by the associated control resistor r8 and control condenser C7, the preferred adjustment being one in which transformer T10 develops its peak voltage at a point in substantial coincidence with the zero point of the welding load current.

The anode of valve V3 may be regarded, for purposes of description, as positive during positive half-cycles of the control current and, consequently, at a predetermined point on the voltage wave during a positive half-cycle following the energization of transformer T8, valve V3 is rendered conductive and enables transformer T7 to energize control transformer T13. Upon being rendered conductive, valve V3 also enables transformer T7 to pass charging current through the rectifier V7 and charge condenser C6. The charge on the condenser C6 either partially or entirely neutralizes the charge on condenser C5 and brings the grid of valve V4 to a conductive value. During the half-cycle in question, however, the anode of valve V4 is negative and, consequently, the just-mentioned action is without effect.

Upon being energized, transformer T13 applies a potential across the control resistor r6, which opposes the negative bias voltage normally applied to the grid of valve V5 by the conventional biasing means indicated by the reference characters DC. In response to this action, which occurs, as will be understood, at approximately the zero point of the welding load current, valve V5 becomes conductive. The principal electrodes of valve V5 are connected between the igniter electrode i and the anode a of main rectifier 80, and as soon as valve V5 is rendered conductive, an igniting potential is applied between the igniting electrode i and the cathode c of rectifier 80. Upon the application of this igniting potential, rectifier 80 becomes conductive and initiates a flow of current to the welding transformer WT.

As aforesaid, the illustrated arrangement is one wherein the firing of rectifier 80 occurs at substantially the zero point of the welding load current, and it will be understood that upon being fired, rectifier 80 remains conductive throughout the balance of the corresponding positive half-cycle of welding load current.

At the beginning of the immediately following negative half-cycle of control voltage, transformer T12 brings the anode of valve V4 to a positive value, at which time the charge on condenser C6 is sufficiently high to overcome the effect of condenser C5 and maintain the grid of valve V4 at a conductive value. At an early stage of the just-mentioned negative half-cycle of voltage, accordingly, transformer T12 is enabled to pass current through valve V4 and energize transformer T14, which thereupon fires control valve V6 in the manner previously described in connection with valve V5. Valve V6, in turn, upon being fired, applies a potential between the igniter i and the cathode c of main rectifier 82, which thereupon becomes conductive and passes welding current to the welding transformer WT throughout such following negative half-cycle.

In order to simplify the present drawings, no phase shifting apparatus is illustrated in connection with the control of the firing valves V5 and V6. It will be understood, however, that phase shifting apparatus, may be interposed between transformers T13 and T14 and their associated firing valves V5 and V6. Such phase-control apparatus may be arranged either to fire valves V5 and V6 at a fixed point relative to the half-cycles of welding current, or to fire these valves at progressively varying points, thereby delivering to the welding circuit, during successive half-cycles, current impulses representing all or any desired fraction of a complete half-cycle of current flow.

The energization of the welding transformer initiates a flow of current through the electrodes and through the work, as will be appreciated. The energization of the welding transformer WT also enables an impulse of current to be passed through a usual rectifier V8 and energize control relay R4, which thereupon opens its contacts R4a and closes its contacts R4b.

The opening of contacts R4a is without immediate effect, since the associated series connected contacts R3a are open under the conditions stated. Closure of contacts R4b completes an energizing circuit for control relay R3, which circuit includes the now closed contacts R1b. Upon completion of this circuit, relay R3 closes its contacts R3a and R3b. The closure of contacts R3a is without immediate effect since contacts R4a are now open, but the closure of contacts R3b completes a self-holding circuit for relay R3.

Relay R2 remains in the energized condition until after the flow of welding current is interrupted by operation of the thermally responsive elements, as described below. Consequently, at the beginning of the next succeeding positive half-cycle, valve V3 is again fired, which action results in the firing, during such positive half-cycle and during the next succeeding negative half-cycle of main rectifiers 80 and 82, in the previously described manner. Similar actions occur during successive positive half-cycles, it being assumed in the present instance that an uninterrupted flow of current throughout the full welding cycle is appropriate. It will be understood that, if desired, the welding current may be supplied in a succession of impulses, in which case means are provided to periodically de-energize and re-energize control relay R2 during the welding cycle.

As the work heats up, in response to the continued flow of welding current therethrough, a progressively increasing potential difference is developed across the thermo-couple leads 66 and 72, which progressively increasing potential is applied to the input terminals of a usual amplifier 86. The output terminals of amplifier 86 are connected across control resistor r5, which, as will be obvious, is coupled to the grid circuit of valve V3 in such relation that the amplifier potential opposes the potential of transformers T8 and T10. The adjustment of the parts is such that when the work reaches the appropriate temperature, the potential across valve V8 is high enough to apply a blocking bias to the grid of valve V3. It will be understood that if this blocking potential is initially applied either during a negative half-cycle of the control current or at a point in a positive half-cycle which is later than the peaking point of transformer T10, such blocking potential is without immediate effect, since valve V3, after having been rendered conducting, remains so for the balance of the corresponding half-cycle. Consequently the sequential firing of rectifiers 80 and 82 initiated by such firing of valve V3 is not interfered with. The presence of the blocking potential on the grid of valve V3, however, renders transformer T10 ineffective to render valve V3 conducting during the next succeeding positive half-cycle. Since valve V3 remains non-conductive, no energizing currents are applied to transformers T13 and T14, and the sequential firing of the main rectifiers 80 and 82 is consequently interrupted.

Upon cessation of the flow of welding current, relay R4 resumes the de-energized condition, re-closing its contacts R4a and re-opening its contacts R4b. The latter action is without immediate effect, in view of the now closed self-holding contacts R3b, but the reclosure of contacts R4a completes energizing circuits for grid transformer T2, associated with valve V1, and for relay R5.

Upon being energized, relay R5 opens its normally open contacts R5a, thereby de-energizing transformer T3. This action immediately de-energizes relay R2, which thereupon re-opens contacts R2a, thereby de-energizing transformer T8. The de-energization of transformer T8 prevents further firing of valve V3, even though, due to cooling of the work, the thermocouple potential falls below the blocking value needed to block current flow through valve V3.

Upon being energized, transformer T2 brings condenser C2 to a fully charged condition and applies a blocking potential to the grid of valve V1, which action, if it occurs during a positive half-cycle, interrupts further flow of current through valve V1, and if it occurs during a negative half-cycle, prevents the initiation of a flow of current at the beginning of the next positive half-cycle. As soon as valve V1 is blocked, the energy stored in the coil of relay R1 starts discharging through the hold-time condenser C1, and at the expiration of an interval (proportioned to be long enough to allow the weld to set) determined by the characteristics of this discharge circuit, relay R1 resumes the de-energized condition, re-opening its contacts R1a and R1b. The opening of contacts R1a de-energizes transformer T1, which action is without immediate effect, since valve V1 is now blocked, as aforesaid. The re-opening of contacts R1b de-energizes the solenoid valve 84 (consequently causing the release of the electrodes from the work), de-energizes transformer T5, and de-energizes relay R3.

The de-energization of transformer T5 re-applies a blocking potential to the grid of valve V2, in readiness for a subsequent operation, but is otherwise without effect in view of the previous de-energization of transformer T3 by relay R5.

The previously mentioned de-energization of relay R3 interrupts the energizing circuit, through contacts R3a, for transformer T2, and enables the energy previously stored in condenser C2 to be discharged through the local circuit including control resistor r1. The re-opening of contacts R3a also de-energizes relay R5, which thereupon recloses its contacts R5a. This action is without effect, except to prepare the system for a subsequent operation, since contacts R1b are now open.

At the expiration of an off-time interval, determined by the characteristics of the discharge circuit for condenser C2, the grid of valve V1 reaches a conductive value, and if at this time pilot switch P is closed, completing an energizing circuit for transformer T1, a succeeding complete welding cycle is initiated. It will be understood that the thermocouple potential will have fallen below the blocking value shortly after the interruption of the flow of welding current, and that the electrode cooling means may be expected to bring the electrodes, during the off-time interval, to the normal or starting temperature thereof.

The transfer switch S normally occupies the illustrated open position, in which the just-mentioned off-time interval must intervene between the conclusion of one welding cycle and the initiation of a succeeding cycle. If the transfer switch S is moved to the closed position, a succeeding welding interval may be initiated as soon, following the close of a preceding welding cycle, as the thermocouple potential falls below the blocking value, although such cycle should not be begun until the electrodes have regained their normal temperatures. This is because the circuits for solenoid valve 34, valve V2, etc., are completed directly by the closure of pilot switch P and do not depend upon the previous energization of relay R1.

Figure 13:
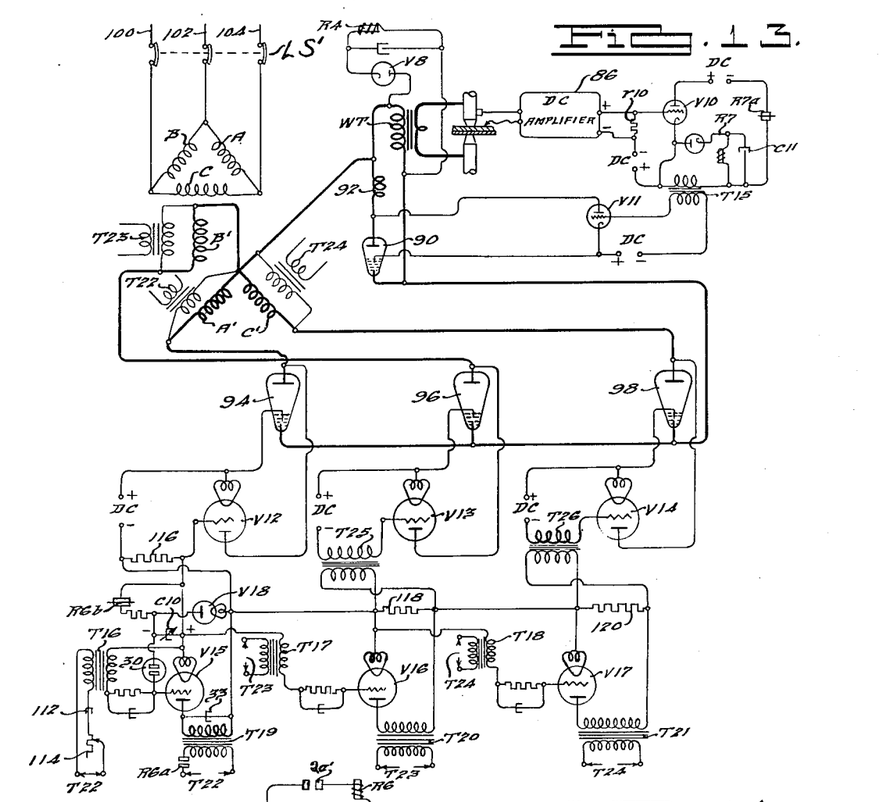
Fig. 13 is a diagrammatic view of a control system embodying a modification of the invention.

Referring now to Fig. 13, the illustrated system embodies certain of the features of Leathers et al. Patent No. 2,329,122, granted September 7, 1943, in combination with thermoelectrically responsive elements arranged to limit the delivery to the welding circuit of a fraction of the complete impulse which would otherwise be delivered to the welding circuit. As before, the electrodes are connected in a local circuit which includes the secondary winding of the welding transformer WT. The system of Fig. 13 is well adapted to the welding of aluminum and certain alloys of aluminum, which, with copper, form a thermocouple. Consequently, in Fig. 13, the thermocouple arrangement of Fig. 6 is utilized. The thermal E. M. F. is applied to the input terminals of a D. C. amplifier 86, the output terminals whereof are connected across control resistance R10, which is coupled to the grid circuit of an electronic valve V10. Valve V10 may be and preferably is of the gas-filled type and is normally biased to a non-conducting condition by a usual biasing means indicated by the reference characters DC. Upon being rendered conducting, which occurs when a critical thermal E. M. F. is developed, valve V10 becomes conducting and passes an impulse of current from the direct current source, designated by the reference characters DC, through an associated transformer T15. This impulse of current fires a firing valve V11, which in turn fires a main rectifier 90, which may be and preferably is of the same type as rectifiers 80 and 82. Upon being rendered conductive, as hereinafter described in more detail, rectifier 90 shunts the primary winding of the welding transformer WT, through a current limiting reactor 92, and interrupts the heating action.

In this instance, each welding current impulse is supplied from a three-phase alternating current source 100, 102, 104, through a three-phase transformer, the primary windings A, B, and C whereof are shown as connected in delta. The secondary windings A', B' and C' of the supply transformer are star connected. The phase designated B' is reversely connected, so that currents and voltages in phases A', B' and C' are displaced sixty electrical degrees from each other, in the relation shown in Fig. 14. The secondary windings A', B' and C' are connected, respectively, to the anodes of a series of rectifiers 94, 96 and 98, the cathodes whereof are connected in parallel with each other and to one terminal of the primary winding of the welding transformer WT. The other terminal of the primary winding of the welding transformer is connected to the star point of the secondary windings of the three-phase transformer. The rectifiers 94, 96 and 98 may be and preferably are of the type described in connection with rectifiers 80 and 82.

The hereinafter described control apparatus, associated with the rectifiers 94, 96 and 98, is such that each operation of the starting control device causes the rectifiers 94, 96 and 98 to be sequentially rendered conducting for all or a predetermined part of a half-cycle of current flow. Except as modified by the afore-mentioned thermoelectric elements, the just-mentioned sequential actuation of the rectifiers 94, 96 and 98 consequently supplies the welding transformer WT with a single impulse of welding current, which is made up of components derived from the individual secondary windings A', B' and C'.

Figure 14:
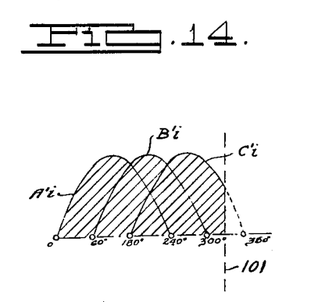
Fig. 14 is a diagrammatic view illustrative of current and voltage conditions obtained with the system of Fig. 13.

This relation is clearly indicated in Fig. 14, wherein the curve A'i represents currents flowing in the secondary winding A'; curve B'i represents currents flowing in the secondary winding B'; and curve C'i represents currents flowing in the secondary winding C'. The vertical line 101 in Fig. 14 represents the time at which the previously mentioned thermo-electric elements fire the shunting rectifier 90 and interrupt further delivery of heating current to the welding transformer, and as is described hereinafter, the thermo-electric apparatus functions to automatically retard or advance the position of the line 101, consequently increasing or decreasing the proportion of each current impulse which is delivered to the welding circuit.

The present system employs a series of three firing valves V12, V13 and V14, which are individual, respectively, to the rectifiers 94, 96 and 98, and the plate circuits whereof are connected to the corresponding rectifiers 94, 96 and 98 in the usual manner. The valves V12, V13 and V14 are preferably of the three-element, gas-filled type, and, as will be understood, they are normally non-conducting, but may be rendered conducting, during half-cycles in which the anodes are positive with respect to the cathodes, by applying a critical potential between the grids and the cathodes thereof.

The valves V12, V13 and V14 are rendered normally non-conducting by applying a negative bias to the grids thereof by suitable full-wave rectifying means indicated by the reference characters DC. In order to fire the respective valves V12, V13 and V14, the just-mentioned negative grid biases are overcome by respectively placing the associated phase control valves V15, V16 and V17 in a conducting condition.

The valves V15, V16 and V17 are provided with grid control apparatus comprising the transformers T16, T17 and T18, which are so controlled that conducting potentials are applied to the grids of these valves at desired critical points in the appropriate half-cycles, and more than one firing action of each valve is prevented by condenser C10, associated with valve V15, as hereinafter described.

A firing action is initiated by energizing transformer T19, which is coupled to the principal electrodes of valve V15, and this is accomplished by energizing a control relay R6, which thereupon closes its normally open contacts R6a and opens its normally closed contacts R6b. As shown, the energization of relay R6 is controlled by the normally open contacts R2a' of a control relay R2, which may and preferably does correspond to the control relay R2, described with reference to Fig. 12. It will be understood that the system of Fig. 13 may and preferably does utilize, in addition to the control elements specifically shown in Fig. 13, all of the control elements shown in Fig. 12, which are positioned above the horizontal dotted line 110 in this figure.

It is thought that the remaining details of the present system may best be understood from a description of the operation of the system as a whole. The system may be conditioned for operation by closing the main line switch LS' of Fig. 13 and by closing line switches LS of Fig. 12. As previously described, the closure of the line switches LS of Fig. 12 energizes blocking transformer T4, which thereupon renders the control valve V2 non-conducting. The closure of the three-phase line switch LS' energizes the primary windings of the three-phase supply transformer, which thereupon energizes a series of control transformers T22, T23 and T24. As before, the closure of either the single phase or the three-phase line switches may be caused to supply heating current to the filaments of the various electronic valves, which heating circuits are not shown in order to simplify the drawings. Similar means may also be provided (not shown) to actuate the biasing means, designated DC.

Transformers T22, T23 and T24 are associated, respectively, with the phases A', B' and C', and supply energy for operating the control elements associated, respectively, with corresponding rectifiers 94, 96 and 98. Grid transformers T16, T17 and T18 associated, respectively, with the various phase control valves V15, V16 and V17, are directly connected to transformers T22, T23 and T24, respectively, and remain energized so long as the latter are energized. Transformers T19, T20 and T21 are also directly responsive, respectively, to the control transformers T22, T23 and T24, and the primary circuit for transformer T19 is also subject, as previously mentioned, to control by the relay R6. These connections are indicated by the reference characters applied to the terminals of transformers T16 through T21. Upon being energized, transformers T17 and T18 apply negative biases to the grids of valves V16 and V17, which biases are overcome, as described below, as a consequence of the firing of valve V15.

As will be appreciated, the now energized transformer T16 is effective, during each successive half-cycle of the voltage across phase A', to apply a positive or conducting potential to the grid of valve V15. Transformer T16 is preferably of the peaking type, so that the voltage thereof is sufficiently high to apply the necessary potential to the grid of valve V15 only during a relatively small fraction of the appropriate half-cycle, and in addition, transformer T16 is provided with conventional adjustable phase shifting elements 112 and 114. The latter may be adjusted to enable transformer T16 to apply the aforementioned conducting potential to the grid of valve V15 at any desired point along the voltage curve of phase A'. In producing the current form shown by the shaded area of Fig. 14, it will be appreciated that this adjustment is such that the peaked voltage of transformer T16 is developed at approximately the hypothetical zero point of the current wave in the corresponding secondary phase A'. Under the conditions now being described, however, relay R6 is de-energized, and consequently, the application of the conducting potential to the grid of valve V15 is without effect.

With the system thus prepared for operation, a welding operation may be initiated, as before, by closing the pilot switch P, which results in the energization of relays R1 and R2 and of the solenoid valve 84 in the previously described manner, the energization of relay R2 being delayed after the energization of valve 84 for an interval sufficient to allow the electrodes to engage the work.

In this instance, the energization of relay R2 causes this relay to close its contacts R2a', which action completes an obvious energizing circuit (Fig. 13) for the control relay R6, which thereupon closes its contacts R6a and opens its contacts R6b. The operations which follow the energization of relay R6 duplicate those described in the aforesaid Leathers et al. Patent No. 2,329,122, and consequently, need only be briefly described in the present application. Briefly, the opening of contacts R6b opens the normally complete discharge circuit for the blocking condenser C10, and closure of contacts R6a energizes the control transformer T19. It will be understood that if the energization of transformer T19 occurs, during a positive half-cycle of phase A, but at a point in such half-cycle which is later than the peaking point of transformer T16, such closure is without effect during the positive half-cycle in question and is also without effect during the following negative half-cycle. When, however, the peaking point of transformer T16 is reached, during a positive half-cycle of phase A, at which time contacts R6a are closed, transformer T16 is enabled to fire valve V15 and enable transformer T19 to build up a potential across resistor 116, which overcomes the effect of the associated biasing means and fires valve V12. Upon being fired, valve V12 fires main rectifier 94 and initiates the flow of current to the welding circuit.

The firing of valve V15 also enables transformer T19 to build up a potential between the grid and cathode of valve V16, which opposes the negative biasing effect of the transformer T17 and fires valve V16. Upon being fired, valve V16 builds up a potential across resistor 118 and energizes transformer T25 in a direction to overcome the corresponding biasing means and fire valve V13. The latter valve, upon being fired tends to fire the main rectifier 96, associated with phase B. As soon as the anode potential of rectifier 96 rises above that of rectifier 94, rectifier 96 becomes conducting and extinguishes rectifier 94. This transfers the current delivery from phase A' to phase B'.

Upon being fired, valve V16 also enables transformer T20 to build up a voltage between the grid and the cathode of valve V17, which overcomes the biasing effect of transformer T18 and fires valve V17. This action enables transformer T21 to energize transformer T26, which thereupon fires valve V14 in the same manner as valve V13 was fired. The firing of valve V14 also tends to fire the remaining main rectifier 98, associated with phase C. As soon as the anode potential of rectifier 98 exceeds that of rectifier 96, rectifier 98 becomes conducting and extinguishes rectifier 96. This transfers the delivery of load current from phase B' to phase C'.

The outputs of the three secondary phases A', B' and C' are thus delivered in a single impulse to the circuit which includes the welding transformer WT and the shunting rectifier 90 in parallel. At the beginning of each impulse of load current, the main rectifier 90 is in a nonconductive condition and, consequently, all of such impulse of current which flows prior to the firing of rectifier 90, as described below, is delivered to the welding transformer and consequently to the electrodes and the work.

The initial firing of valve V15 also enables transformer T19 to deliver charging current to the blocking condenser C10 through a usual rectifier V18. Condenser C10 is coupled to the grid of valve V15 in such relation that when this condenser is fully charged it applies a negative or blocking bias to the grid of valve V15 and prevents further firing actions of this valve even though contacts R6a remain closed during the next succeeding positive half-cycle of the voltage of phase A.

The initiation of flow of load current through the welding transformer WT energizes relay R4 in the previously described manner, and upon being energized, relay R4 energizes relay R3. Also, as before, relay R3, upon being energized, completes a self-holding circuit through its contacts R3b and closes its contacts R3a to prepare a circuit for transformer T2 and for relay R5 (Fig. 12). The increase in temperature of the work, occasioned by the flow of welding current therethrough, produces a progressively rising thermoelectric potential between the thermocouple elements. When this potential, as amplified by the amplifier 86, reaches a predetermined critical value, the resultant voltage across the control resistor R10 overcomes the negative biasing means associated with the grid of valve V10 and renders the latter conducting. At this time, the direct current source associated with the principal electrodes of valve V10 is enabled to pass an impulse of current through transformer T15, which impulse overcomes the negative bias normally applied to the grid of valve V11 and renders this valve conducting.

When valve V11 is rendered conducting, a firing potential is applied between the igniter electrode and the cathode of the main rectifier 90, which thereupon becomes conductive and completes a shunt circuit, through the current limiting reactor 92, in parallel with the primary winding of the welding transformer WT. Upon completion of this shunt circuit, the further flow of current through the welding transformer WT is so far reduced as to interrupt the heating action and terminate the welding operation, and it will be understood that this termination may occur at a time represented by the line 101 in Fig. 14, which line may be located either in advance of or later than the position shown in Fig. 14.

Upon the cessation or at least reduction in flow of current through the welding transformer, the current available to relay R4 is insufficient to maintain this relay in the energized position and it thereupon resumes the de-energized position, re-opening its contacts R4b and reclosing its contacts R4a. These actions complete the resetting of the system and the ultimate release of the electrodes from the work in the manner previously described in connection with Fig. 12.

In addition, in the arrangement now being described, the de-energization of relay R2, which follows as a consequence of the de-energization of relay R4, also de-energizes relay R6, which thereupon re-opens its contacts R6a and recloses its contacts R6b. The re-opening of contacts R6a prevents further firing of the system, as will be obvious. The reclosure of contacts R6b completes a discharge circuit for the blocking condenser C10, as a consequence of which the negative bias applied by this condenser to valve V15 is eliminated, in readiness for the next welding operation.

As before, the interruption of the welding current also enables the dissipation of the thermoelectric potential, which action, however, is without effect, since, upon having been fired, the shunting rectifier 90 remains conducting throughout all of that part of the current impulse of Fig. 14, which lies to the right of the line 101. It is noted that the firing of valve V10 also energizes an auxiliary control relay R7, which thereupon opens its contacts R7a and limits the delivery of current to transformer T15 to a single impulse. A condenser C11 holds relay R7 energized until such time as the thermoelectric potential falls below the value needed to fire valve V10.

Figure 15:
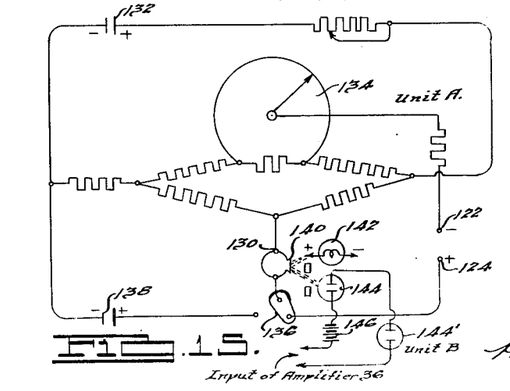
Fig. 15 is a diagrammatic view of a further modification of the invention.

Fig. 15 illustrates a modification of the invention, wherein a potentiometer is interposed between the thermocouple leads and the amplifier 86. In Fig. 15, the thermoelectric potential as developed between the previously mentioned thermocouple leads is applied to the terminals 122 and 124 of a usual potentiometer circuit, in which the potential applied to a galvanometer element 130 is proportional to the difference between the thermoelectric potential across the terminals 122—124 and the potential of a direct current source 132. A slide wire rheostat 134 may be provided to adjust the balance between the last-mentioned potentials. A switch 136, which normally occupies the illustrated position, may be thrown into engagement with a cooperating normally disengaged terminal, so as to connect a calibrating battery 138 into circuit. The moving element of the galvanometer 30 carries a mirror 140, and when the thermoelectric potential reaches the critical value, mirror 140 assumes a position in which it reflects light from a source 142 onto a photoelectric cell 144, which is coupled, through a source 146, to the input leads of the previously mentioned amplifier 86. This arrangement is advantageous, since, as will be understood, the amplifier output voltage remains at a negligible value until the critical thermoelectric potential is reached, at which time the amplifier output abruptly rises to a sufficiently high value to block the further flow of welding current.

In Fig. 15, also, a second cell 144' is connected in series with the cell 144. Cell 144' may be provided with a potentiometer unit B, similar in all respects to the above-described unit A. Unit B, as will be understood, may be provided with a thermocouple responsive to a part of the welding system other than the part to which the previously mentioned thermocouple is responsive. For example, the second thermocouple may be directly associated with the other work engaging electrode. With this arrangement, the welding current is continued until both thermoelectric potentials reach the critical value.

Although only several specific embodiments of the invention have been described in detail, it will be appreciated that various further modifications in the invention may be made without departing from the spirit and scope thereof.

What is claimed is:

1. In a resistance welding apparatus having at least one work engaging electrode and means for applying a pressure between said work and said electrode, the combination of means for initiating a flow of current through the electrode and work to form a fused weld nugget in the work, means for modifying said current so as to reduce the heating effect on the work and enable said nugget to solidify, means for controlling said pressure means so as to maintain pressure between said work and electrode for a controllable period after said modification and for releasing said pressure at the expiration of said period, means for effecting a measurement of and operably responsive to temperature in the region of said nugget, and means operated as a consequence of the operation of said temperature responsive means for actuating said current modifying means and said pressure control means.

2. In a resistance welding apparatus having at least one work engaging electrode and means for applying a pressure between said work and said electrode, the combination of means for initiating a flow of current through the electrode and work to form a fused weld nugget in the work, means for modifying said current so as to reduce the heating effect on the work and enable said nugget to solidify, means for controlling said pressure means so as to maintain pressure between said work and electrode for a controllable period after said modification and for releasing said pressure at the expiration of said period, means for effecting a measurement of and operably responsive to temperature in the region of said nugget, and means operated as a consequence of the operation of said temperature responsive means for actuating said current modifying means and said pressure control means, said last-mentioned means including means whereby said current modifying means and pressure control means after being so actuated are unaffected by the drop in temperature which results from said current modification.

3. In a resistance welding apparatus having at least one work engaging electrode and means for applying a pressure between said work and said electrode, the combination of means for initiating a flow of current through the electrode and work to form a fused weld nugget in the work, means for interrupting said current to enable said nugget to solidify, means for controlling said pressure means so as to maintain pressure between said work and electrode for a controllable period after said interruption and for releasing said pressure at the expiration of said period, means for effecting a measurement of and operably responsive to temperature in the region of said nugget, and means operated as a consequence of the operation of said temperature responsive means for actuating said current interrupting means and said pressure control means.

4. In a resistance welding apparatus having at least one work engaging electrode and means for applying a pressure between said work and said electrode, the combination of means for initiating a flow of current through the electrode and work to form a fused weld nugget in the work, means for interrupting said current to enable said nugget to solidify, means for controlling said pressure means so as to maintain pressure between said work and electrode for a controllable period after said interruption and for releasing said pressure at the expiration of said period, means for effecting a measurement of and operably responsive to temperature in the region of said nugget, and means operated as a consequence of the operation of said temperature responsive means for actuating said current interrupting means and said pressure control means, said last-mentioned means including means whereby said current interrupting means and pressure control means after being actuated are unaffected by the drop in temperature which results from said current interruption.

5. In a welding apparatus having a work engaging electrode and having means for causing the electrode to engage the work, said means being actuable to release said engagement, means for passing welding current through the electrode to the work, means operated in accordance with the temperature of the work for controlling the flow of current to the work, and means operated as a consequence of the operation of said temperature operated means for actuating said first-mentioned means to effect said release.

6. In resistance heating apparatus having a work engaging electrode through which current is supplied to the work, means for initiating a flow of current through the electrode and the work so as to form a weld nugget, means for effecting a measurement of temperature at the surface of the work and within the area thereof which is engaged by the electrode, and means responsive to said measurement for controlling said current flow, said means including a thermocouple, one element whereof is constituted by the work and the other whereof is carried by the electrode.

7. Resistance welding apparatus comprising an electrode having a body and a work engaging surface, and a thermocouple element received in said body but insulated therefrom, said element having an uninsulated end which is exposed upon said work engaging surface in such relation that the element can be electrically joined to the surface of the work within the area thereof which is engaged by said surface when pressure is applied between the work and the electrode, said joinder enabling said element and said work to function as a thermocouple.

8. In resistance welding apparatus having a work engaging electrode and means for causing pressure to be applied between the work and the electrode, means including an electric discharge device through which current may be transmitted to the electrode and the work so as to form a weld nugget in the work, control means for controlling said pressure applying means and for actuating said device so as to initiate a said flow of current, thermoelectrically operable means for effecting a measurement of temperature in the region of said nugget during said flow of current, said control means operating in response to said measurement to actuate said device and modify said flow of current and to actuate said pressure means so as to cause pressure to be maintained for a controlled period after said modification, said modification of current reducing the heating effect on the work so as to enable said nugget to solidify, said controlled period being long enough to permit said solidification and said pressure being relieved at the expiration of said period.

9. In an electrical heating apparatus having a work engaging member and having means for causing the member to engage the work, said means being actuable to release the member from said engagement means for passing heating current through the member to the work, control means operated in accordance with a physical characteristic of the work in the region being heated, which characteristic varies during the heating action, means rendering said control means operative to control the flow of heating current, and means operated as a consequence of the operation of said control means for actuating said first-mentioned means to cause said release.

10. In an electric heating apparatus, the combination comprising a work engaging structure having a face disposed to engage the work and through which point of engagement current may be passed through the work and the structure so as to heat the work, repeated such engagements affecting the said face in such relation as to require such face to be periodicaly dressed away, said structure comprising a thermocouple constituted in part by a conductive element, a thermal junction of said thermocouple being afforded in the immediate region of said face, said thermocouple being so constituted that as said face is dressed away, said thermal junction is moved by said dressing so that the relocated junction remains in the immediate region of the dressed face.

11. The structure of claim 10 wherein said element is formed of a material which with the material from which at least a part of said face is formed forms a thermocouple, and wherein the thermal junction is formed between an exposed end of said element and said part of said face.

12. The structure of claim 10 wherein said element is formed of a material which with the material from which at least a part of said face is formed forms a thermocouple, and wherein the thermal junction is formed between an exposed end of said element and said part of said face, said junction being at least initially formed by pressure exerted against said face.

13. For use in heating work by the flow of electric current therethrough, a thermally-responsive, work-engaging, electrode assembly comprising a body through which the said current may flow, a thermally-responsive element embedded in said body for co-operating in measuring heating produced by said flow of current, and means for supporting said element relative to said body, said means constituting a portion of the work engaging face of the electrode and being a substantially flush continuation of the remainder of said face.

14. Structure of claim 13, wherein said means is a plug fitted into a recess in the work engaging face of the electrode and having a surface which forms a substantially flush continuation of said face.

15. Structure of claim 13, wherein said element is one element of a thermocouple disposed to have a thermal junction in the immediate region of the work engaging face of the body.

16. Structure of claim 13, wherein said means supports said element with an end portion of said element exposed upon the work engaging face of the electrode.

17. Structure of claim 13, wherein said element is a wire electrically joined to the electrode body in the immediate region of the face of the electrode and forming therewith a thermocouple.

18. Structure of claim 13, wherein said element is a wire having its end portion exposed upon the work engaging face of the electrode so when the electrode bears against the work the wire engages the work and forms therewith a thermocouple.

19. In resistance heating apparatus, in which work is heated by the flow of electric current therethrough, the combination of a thermally responsive work engaging electrode assembly comprising a body through which said current flows, a thermally responsive element embedded in said body for cooperating in measuring heating produced by said flow of current, means forming part of the work engaging face of the electrode body for supporting said element relative to said body, means for causing a said flow of current, and means operably responsive to said element for controlling said flow.

20. Apparatus as defined in claim 19, wherein said means is a plug fitted into a recess in the work-engaging face of the electrode and having a surface which forms a substantially flush continuation of said face.

21. Apparatus as defined in claim 19 wherein said element is one element of a thermocouple disposed to have a thermal junction in the immediate region of the work-engaging face of the body.

22. Apparatus as defined in claim 19 wherein said means supports said element with an end portion of said element exposed upon the work-engaging face of the electrode.

23. Apparatus as defined in claim 19 wherein said element is one element of a thermocouple, another element whereof is constituted by the work, the thermal junction of said thermocouple being at the junction between the electrode and the work.

24. In resistance heating apparatus having a work engaging electrode through which current is supplied to the work, means for initiating a flow of current through the electrode and the work so as to form a weld nugget, means for effecting a measurement of temperature at the surface of the work and within the area thereof which is engaged by the electrode, and means responsive to said measurement for controlling said current flow, said means including a thermocouple, one element whereof is constituted by the work and the other element whereof is constituted by the electrode.

CHESTER F. LEATHERS.